(12) United States Patent
Ichimura

(10) Patent No.: US 8,873,156 B2
(45) Date of Patent: Oct. 28, 2014

(54) ZOOM LENS AND OPTICAL APPARATUS

(75) Inventor: Junya Ichimura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 526 days.

(21) Appl. No.: 13/295,702

(22) Filed: Nov. 14, 2011

(65) Prior Publication Data

US 2012/0293870 A1 Nov. 22, 2012

(30) Foreign Application Priority Data

Nov. 16, 2010 (JP) ................................. 2010-255867

(51) Int. Cl.
*G02B 15/17* (2006.01)
*G02B 15/14* (2006.01)

(52) U.S. Cl.
CPC ....................................... *G02B 15/17* (2013.01)
USPC ........................................... 359/679; 359/683

(58) Field of Classification Search
CPC .................................. G02B 15/17; G02B 15/14
USPC .................................................. 359/679, 683
See application file for complete search history.

(56) References Cited

U.S. PATENT DOCUMENTS

| | | | |
|---|---|---|---|
| 4,848,883 A | | 7/1989 | Maruyama |
| 5,687,026 A | | 11/1997 | Sato |
| 5,745,300 A | * | 4/1998 | Usui et al. ....................... 359/684 |
| 5,757,554 A | * | 5/1998 | Fukami ........................... 359/684 |
| 5,760,967 A | * | 6/1998 | Terasawa et al. ............... 359/684 |
| 5,966,246 A | * | 10/1999 | Yoshikawa .................... 359/686 |
| 6,512,637 B1 | * | 1/2003 | Tomita ........................... 359/686 |
| 7,589,909 B2 | * | 9/2009 | Ikeda ............................. 359/688 |
| 2003/0214705 A1 | | 11/2003 | Ozaki |

FOREIGN PATENT DOCUMENTS

| | | |
|---|---|---|
| CN | 101334518 A | 12/2008 |
| JP | 63188110 A | 8/1988 |
| JP | 07-043611 A | 2/1995 |
| JP | 2000-284174 A | 10/2000 |

OTHER PUBLICATIONS

Chinese Office Action cited in Chinese counterpart application No. CN201110362686.5, dated Dec. 10, 2013. English translation provided.
Japanese Office Action issued in Japanese counterpart application No. JP2010-255867, dated Oct. 23, 2012.

* cited by examiner

*Primary Examiner* — Scott J Sugarman
(74) *Attorney, Agent, or Firm* — Rossi, Kimms & McDowell LLP

(57) ABSTRACT

A zoom lens and optical apparatus includes, in order from a magnification conjugate side, a first lens unit that has a positive refractive power and is fixed during magnification variations, and a magnification-variable unit configured to move for magnification variations. The first lens unit includes, in order from the magnification conjugate side, a first lens sub-unit that has a positive refractive power and is configured to move during focusing, and a second lens sub-unit that has a positive refractive power and moves during focusing. The first lens sub-unit and the second lens sub-unit move and reduce an interval between the first lens sub-unit and the second lens sub-unit for focusing from infinity to a close end. A surface of the second lens sub-unit closest to the magnification conjugate side has a concave shape on the magnification conjugate side.

20 Claims, 7 Drawing Sheets

ZOOM LENS AND OPTICAL APPARATUS

BACKGROUND OF THE INVENTION

1. Field of the Invention

The present invention relates to a so-called positive lead type zoom lens in which a first lens unit has a positive refractive power, and an optical apparatus having the same.

2. Description of the Related Art

In focusing in a positive lead type zoom lens by moving out the entire first lens unit, an aberrational correction may become insufficient at a close end side on which a focus moving amount becomes larger because a single lens unit provides in-focusing and aberrational corrections. Accordingly, each of Japanese Patent Laid-Open Nos. 07-43611 and 2000-284174 divides, in order from the magnification conjugate side, a F11 sub-unit having a positive refractive power, and a F12 sub-unit having a positive refractive power, and moves the F12 sub-unit to the magnification conjugate side for focusing. The prior art reduce deteriorations of the imaging performance associated with focusing from the long object distance to the close end position by adjusting the power of each sub-unit.

However, the methods proposed by Japanese Patent Laid-Open Nos. 07-43611 and 2000-284174 are insufficient in restraining the aberrational variations since the height of an off-axis principal ray in the F12 sub-unit significantly changes during focusing from the distant position to the close end position.

In addition, the ghost has recently been problematic which is caused when light reflected on the reduction conjugate plane by an element is reflected on an arbitrary surface in the lens and again reaches the reduction conjugate plane. In that context, an element having a high surface refractive index has been increasingly used as an element for the reduction conjugate side such as a Liquid crystal on Silicon® (LCOS) for a reflection type projector and a CCD or a CMOS for a digital camera. Conventionally, this ghost is an issue in the first lens unit of the positive lead zoom lens.

SUMMARY OF THE INVENTION

The present invention provides a positive lead type zoom lens which can reduce aberrational variations during focusing, and restrain generations of ghosts.

A zoom lens according to the present invention includes, in order from a magnification conjugate side, a first lens unit that has a positive refractive power and is fixed during magnification variations, and a magnification-variable unit configured to move for magnification variations. The first lens unit includes, in order from the magnification conjugate side, a first lens sub-unit that has a positive refractive power and is configured to move during focusing, and a second lens sub-unit that has a positive refractive power and is configured to move during focusing. The first lens sub-unit and the second lens sub-unit are configured to reduce an interval between the first lens sub-unit and the second lens sub-unit for focusing from infinity to a close end. A surface of the second lens sub-unit closest to the magnification conjugate side has a concave shape on the magnification conjugate side.

Further features of the present invention will become apparent from the following description of exemplary embodiments with reference to the attached drawings.

DESCRIPTION OF THE EMBODIMENTS

Figure 7A:
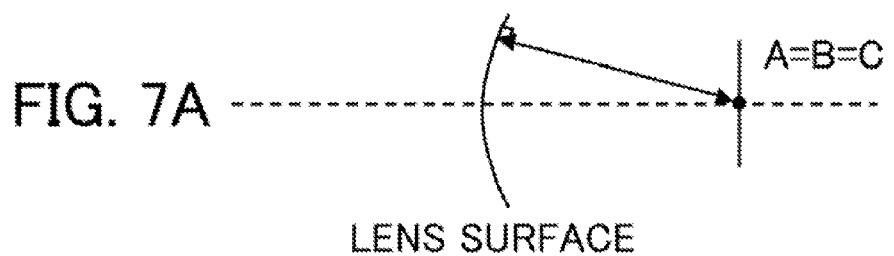
FIGS. 7A to 7C are views for explaining imaging ghosts.
Figure 7B:
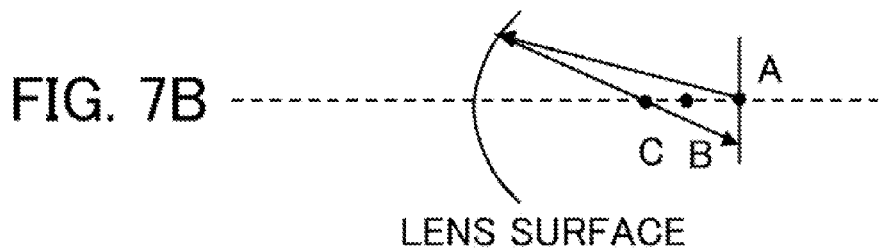
Figure 7C:
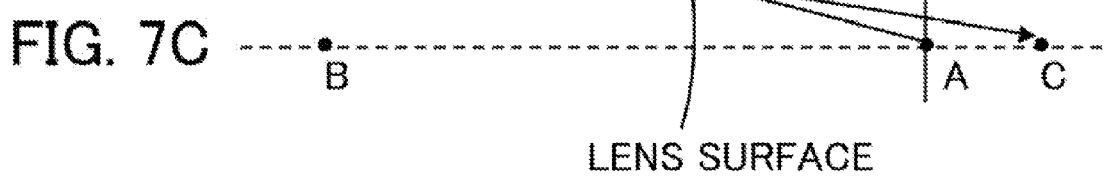

A brief description will be given of a principal of an imaging ghost with reference to FIGS. 7A-7C using axial light as an example. FIGS. 7A-7C each schematically illustrate a relationship between a reduction conjugate plane A and a lens surface. When a ray having an axial image height passes an arbitrary lens surface, and a center of curvature B of the lens surface accords with an object point C of the ghost light as illustrated in FIG. 7A, the light reflected on the lens surface reaches the reduction side conjugate plane passing the same optical path. Therefore, the ghost light occurs having a peak intensity that is strong on the reduction conjugate plane.

When a bright point that slightly shifts from the optical axis forms an image on the reduction conjugate plane, the ghost light caused by that reflected light forms an image at an approximately symmetrical position with respect to the optical axis. In order to reduce this imaging ghost, it is necessary to change the radius of curvature of the lens surface as illustrated in FIGS. 7B and 7C, and to shift the object point C of the ghost light from the center B of curvature of the lens surface. In this case, the ghost image diffuses, its peak intensity decreases, and thus the ghost image becomes less likely to stand out.

When the ghost light is greatly defocused, part of the reflected light from the lens surface is shielded by a diaphragm or a barrel and the ghost light itself can be weakened. In order to reduce the ghost light, shielding and weakening of the ghost light in this way is effective and efficient.

When FIG. 7B is compared with FIG. 7C, FIG. 7B illustrates an under focus configuration of the ghost light reflected on the lens surface, and FIG. 7C illustrates an over focus configuration of the ghost light reflected on the lens surface. When these figures are compared with each other, FIG. 7C can reduce the ghost light more effectively with a small focus change than FIG. 7B because FIG. 7C introduces a ray to the diaphragm side or the lens aperture side.

In other words, in order to effectively reduce the ghost light in the positive lead type first lens unit, a curvature of a lens on its interface that contacts air may be set so that its surface has a concave on the magnification conjugate side. In addition, the so-called positive lead in which the first lens unit has a positive refractive power needs a shape that can sufficiently correct aberrations, such as a chromatic aberration and a distortion, since the off-axial ray height becomes high in the first lens unit.

The first lens unit in the conventional positive lead type lens usually has a convex surface on the magnification conjugate side so as to mainly prevent a spherical aberration or the like of a telephoto end side, and thus is likely to cause the ghost light. On the other hand, this embodiment provides a concave surface to G2 in FIG. 8 on the magnification conjugate side.

According to this embodiment, the first lens unit as a whole can increase the number of concave surfaces on the magnification conjugate side. In addition, this configuration can comparatively increase the refractive power of the positive lens in the first lens unit because the negative power surface in the first lens unit provides the spherical aberration on an over side. Thereby, the under focus configuration of the ghost light can sufficiently reduce a radius of curvature of a surface of G1 on the magnification conjugate side or a surface of G4 on the on the magnification conjugate side. As a consequence, the configuration of this embodiment can reduce the ghost light more effectively than the conventional positive lead type zoom lens. Herein, the term "over" means that an imaging position of a ray having a high incident height upon the optical surface is closer to the reduction conjugate side than the imaging position of the ray having a low incident height. The term "under" means that an imaging position of a ray having a high incident height is closer to the magnification conjugate side than the imaging position of the ray having a low incident height.

In addition, the shape of this embodiment is effective to the aberrational corrections. By arranging a negative power surface at a position of a high off-axis ray's height in the first lens unit, high-order aberrations of the distortion and the lateral chromatic aberration can be restrained and efficiently corrected at the position of the o high ff-axis ray height. In particular, when highly dispersive glass is used for the negative lens G2, a chromatic aberration on the blue side can be returned to the under side at the position of the high off-axis ray's height.

Figure 8:
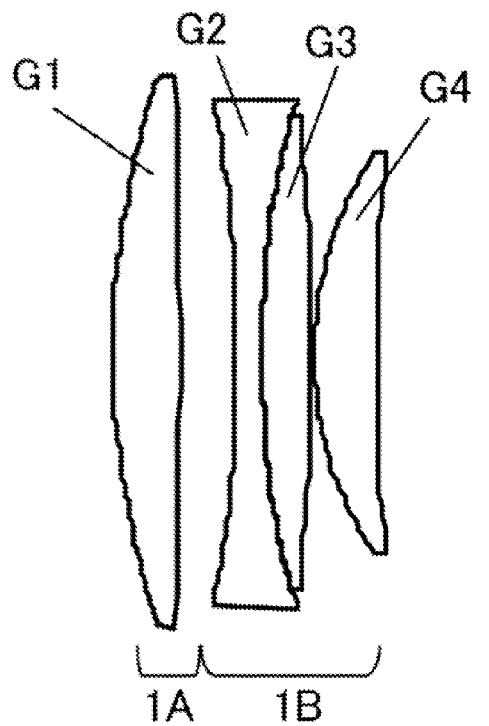
FIG. 8 is a view for explaining a first lens unit according to this embodiment.

When the first lens unit is divided into 1A lens sub-unit and 1B lens sub-unit, as illustrated in FIG. 8, an angle of the off-axis principal ray relative to the optical axis can be comparatively reduced in the 1B lens sub-unit by the effect of the negative power surface of the lens G2 on the magnification conjugate side. Hence, height changes of the off-axis principal ray in the 1B lens sub-unit during distance variations and zooming become smaller than those in the prior art, and the aberrational variations during focusing can be restrained when the 1B lens sub-unit is used for focusing.

The first lens unit of this embodiment can improve a variety of performances as well as remarkably reducing the ghost.

In the so-called floating in which lens sub-units 1A and 1B are simultaneously moved during focusing, each lens sub-unit can be moved so as to correct the lateral chromatic aberration and curvature of field, and the aberrational variations associated with focusing can be reduced more effectively.

The following conditional expression may be satisfied:

$$1.0 < f_{1B}/f_{1A} < 3.0 \qquad (1)$$

where $f_{1A}$ is a focal length of the 1A lens sub-unit, and $f_{1B}$ is a focal length of the 1B lens sub-unit. Expression (1) determines the power balance in the 1A lens sub-unit. When the value exceeds the lower limit, the power becomes weak in the 1A lens sub-unit and the imaging ghost becomes likely to occur, because the incident angle of a ray upon the lens surface on the magnification conjugate side in G1 becomes close to a perpendicular near the optical axis in FIG. 8. When the value exceeds the upper value, the power of the 1B lens sub-unit becomes weak and a moving amount for focusing increases, causing the aberrational variation.

In addition, $f_{1A}$ and $f_{1B}$ may satisfy the following expression:

$$1.3 < f_{1B}/f_{1A} < 2.2 \qquad (2)$$

The following conditional expression may be further satisfied:

$$-1.0 < f_{1A}/(R_{G21}/(N_{G2}-1)) < -0.5 \qquad (3)$$

where $R_{G21}$ is a radius of curvature of a refractive surface closest to the magnification conjugate side in the 1B lens sub-unit, and $N_{G2}$ is a refractive index of the lens closest to the magnification conjugate side in the 1B lens sub-unit.

Expression (3) determines a shape of the negative power surface of G2. The value exceeding the upper limit causes insufficient corrections of the chromatic aberration of the 1B lens sub-unit and excessive amounts of the astigmatism and the like. When the value exceeds the lower limit, the power of the 1B lens sub-unit becomes weaker and a moving amount for focusing increases or the number of lenses of the 1B unit increases. In particular, the excessive number of lenses increases the number of ghost generating surfaces.

In addition, $f_{1A}$, $R_{G21}$, and $N_{G2}$ may satisfy the following expression:

$$-0.85 < f_{1A}/(R_{G21}/(N_{G2}-1)) < -0.65 \qquad (4)$$

The following conditional expression may be further satisfied:

$$0.95 < N_{GR}/N_{GF} < 1.05 \qquad (5)$$

$N_{GR}$ is a refractive index on the reduction conjugate side of the cemented lens including G2 and G3. $N_{GF}$ is a refractive index on the magnification conjugate side of the cemented lens.

Expression (5) determines that G2 and G3 in the cemented lens in FIG. 8 have similar refractive indexes. Expression (5) is effective to the reduction of the ghost light due to a small amount of reflected light on the cemented surfaces between glasses having similar refractive indexes.

$N_{GR}$ and $N_{GF}$ may further satisfy the following conditional expression:

$$0.97 < N_{GR}/N_{GF} < 1.03 \qquad (6)$$

The following conditional expression may be further satisfied:

$$0.02 < \theta gF - (0.6438 - 0.001682 \times vd) < 0.08 \qquad (7)$$

where $vd = (Nd-1)/(NF-NC)$, $\theta gF = (Ng-NF)/(NF-NC)$, Nd, NF, NC, and Ng are refractive indexes for the d-line, F-line, C-line, and g-line.

Expression (7) determines the anomalous dispersion of the G2 lens in FIG. 8. When this is satisfied, the lateral chromatic aberration of a high order on the blue side can be efficiently corrected at G2. When the value exceeds the upper limit, it becomes difficult to inexpensively obtain an material and to stably supply the demanded optical performance in the productivity because the material is limited to a resin material or the like that is hard to work. When the value exceeds the lower limit, the correction of the lateral chromatic aberration of the high order becomes insufficient.

$vd$ and $\theta gF$ may further satisfy the following expression:

$$0.02 < \theta gF - (0.6438 - 0.001682 \times vd) < 0.05 \qquad (8)$$

When the first lens unit includes, in order from the magnification conjugate side, a positive lens, a cemented lens of a negative lens and a positive lens, and a positive lens, the following expressions may be satisfied:

$$0 < SF1 < 4 \qquad (9)$$

$$0.5 < SF4 < 7 \qquad (10)$$

$$1 < SF23 < 10 \qquad (11)$$

Herein, where RF denotes a radius of curvature of a surface of each single lens or lens unit on the magnification conjugate side, and RR denotes a radius of curvature of its surface on the reduction conjugate side, the following expression is defined: SF (shape factor)=(RF+RR)/(RR−RF).

In Expression (9), SF1 denotes a SF of the positive lens (first positive lens) closest to the magnification conjugate side in the first lens unit. From the above expression, where RF1 is a radius of curvature of a surface on the magnification conjugate side of the positive lens closest to the magnification conjugate side in the first lens unit, and RR1 is a radius of curvature of a surface of the positive lens closest to the reduction conjugate side, SF1=(RF1+RR1)/(RR1−RF1) is established.

Similarly, in Expression (10), SF4 denotes a SF of the positive lens (second positive lens) closest to the reduction conjugate side in the first lens unit. Where RF4 is a radius of curvature of a surface on the magnification conjugate side of the positive lens, and RR4 is a radius of curvature of a surface of the positive lens closest to the reduction conjugate side, SF4=(RF4+RR4)/(RR4−RF4) is established.

Similarly, in Expression (11), SF23 denotes a SF when a cemented lens of the second lens and the third lens is regarded as a single lens. Where RF23 is a radius of curvature of a surface of the cemented lens closest to the magnification conjugate side, and RR23 is a radius of curvature of a surface of the cemented lens closest to the reduction conjugate side, SF23=(RF23+RR23)/(RR23−RF23) is established.

SF is a shape factor of a single lens, and when |SF|>1, both of the positive lens and the negative lens have so-called meniscus shapes. When only the avoidance of the imaging ghost is considered, both of the positive lens and the negative lens in the first lens unit may have concave surfaces on the magnification conjugate side or meniscus lenses are suited but then the first lens unit has a difficulty in obtaining the positive power.

Accordingly, as in Expression (9), the positive lens closest to the magnification conjugate side may have the strongest refractive power on the lens surface on the magnification conjugate side. The positive lens closest to the reduction conjugate side may have a larger SF as in Expression (10) than that as in Expression (9), because a ray becomes convergent light to the reduction conjugate plane. The negative lens may have a meniscus shape in which the concave surface is formed on the magnification conjugate side as in Expression (11), but this embodiment produces a cemented lens of the biconcave negative lens G2 and the biconvex positive lens as in FIG. 8 and enhances the correction effects of the longitudinal and lateral chromatic aberrations.

When the value exceeds the upper limit of Expression (9), a nearly on-axis ray becomes close to a perpendicular to the lens surface on the reduction conjugate side and is likely to cause the imaging ghost. When the value exceeds the lower limit, the refractive power of the positive lens becomes excessively strong so as to avoid the imaging ghost on the lens surface on the magnification conjugate side, and the spherical aberration or the like may deteriorate.

When the value exceeds the upper limit of Expression 10, the imaging ghost is likely to occur. When the value exceeds the lower limit, the spherical aberration or the like may deteriorate.

When the value exceeds the upper limit of Expression 11, a curvature of the surface of the negative lens on the magnification conjugate side becomes excessively small and a large amount of high-order aberrations, such as a lateral chromatic aberration and an astigmatism, caused by the off-axis ray occurs. When the value exceeds the lower limit, the lens surface on the reduction conjugate side has a convex shape on the magnification conjugate side, and the imaging ghost is likely to occur.

SF1, SF4, and SF23 may satisfy the following expressions:

$$0.5 < SF1 < 3.5 \qquad (12)$$

$$1.0 < SF4 < 4.5 \qquad (13)$$

$$2 < SF23 < 6 \qquad (14)$$

At least one of or all of Expressions 1-14 may be satisfied.

First Embodiment

Figure 1:
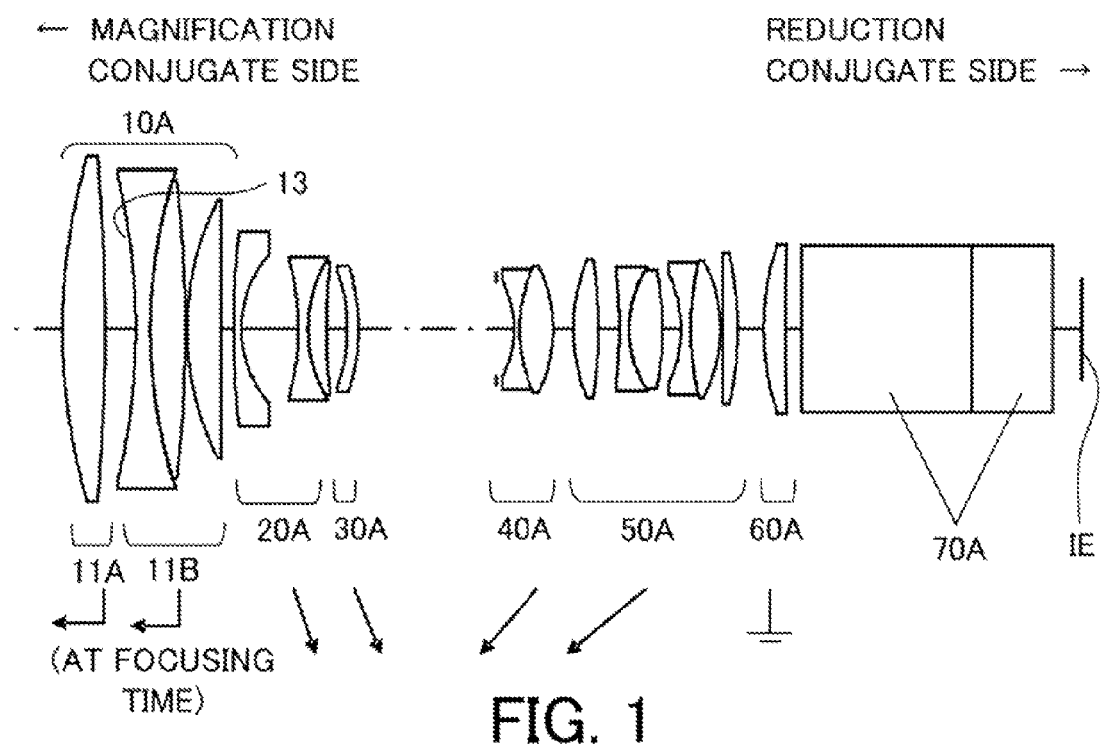
FIG. 1 is a sectional view of a zoom lens at a wide-angle end according to a first embodiment of the present invention.

FIG. 1 is an optical path diagram on a wide-angle end of a zoom lens according to a first embodiment. The zoom lens of this embodiment includes, in order from a magnification conjugate side to a reduction conjugate side, first to sixth lens units 10A to 60A. The first to sixth lens units 10A to 60A include totally seventeen lens elements. Reference numeral 70A denotes a polarization beam splitter. IE denotes a liquid crystal display element. The first to sixth lens units 10A to 60A have positive, negative, negative, negative, positive, and positive refractive (or optical) powers, respectively.

In the magnification variation (zooming), the second, third, fourth, and fifth lens units 20A to 50A move in the optical axis direction. The first lens unit 10A and the sixth lens unit 60A are fixed and do not contribute to the magnification variation. The second to fifth lens units 20A to 50A are magnification-variable (lens) units.

The first lens unit 10A includes a first lens sub-unit 11A that is arranged on the magnification conjugate side and has a positive refractive power, and a second lens sub-unit 11B that is arranged on the reduction conjugate side and has a positive refractive power. The first and second lens sub-units 11A and 11B move to the magnification conjugate side and reduce an interval between them during focusing from the infinity to the close end. The first lens sub-unit 11A corresponds to the 1A lens subunit in FIG. 8 and the second lens sub-unit 11B corresponds to the 1B lens sub-unit.

The first lens sub-unit 11A includes one positive lens in FIG. 1 (corresponding to the lens G1 in FIG. 8) but may include at least one positive lens.

A surface 13 of the second lens sub-unit 11B closest to the magnification conjugate side (corresponding to a surface of the lens G2 on the magnification conjugate side in FIG. 8) has a concave shape on the magnification conjugate side. The second lens sub-unit includes, but is not limited to, a cemented lens of a biconcave negative lens and a biconvex positive lens along the optical path from the magnification conjugate side, and one positive lens.

Figure 2:
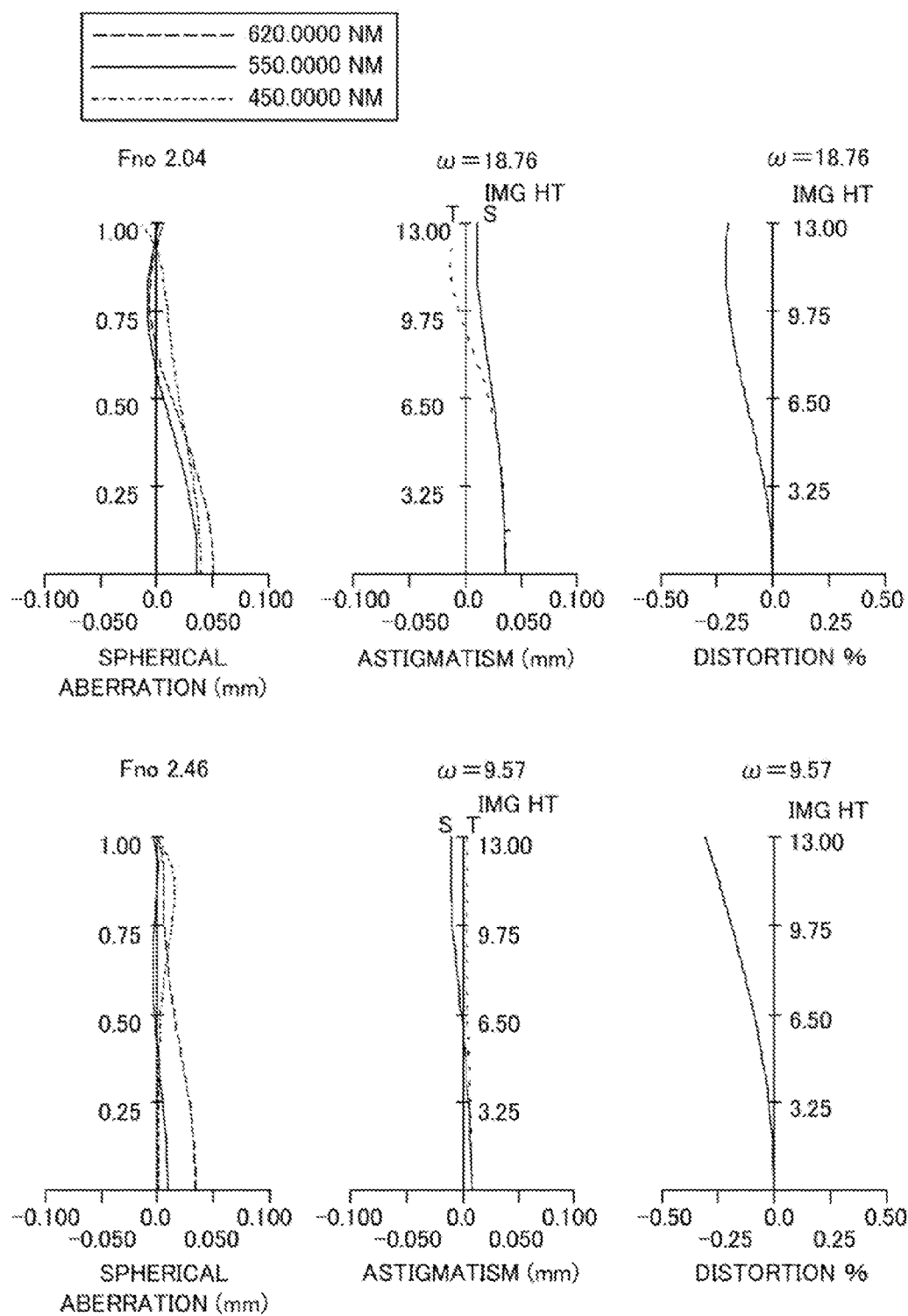
FIG. 2 illustrates aberrational diagrams of the zoom lens illustrated in FIG. 1 according to the first embodiment.

FIG. 2 illustrates aberrational diagrams (including, in order from the left side, a spherical aberration, an astigmatism, and a distortion) on the wide-angle end and the telephoto end of the zoom lens with a projection distance of 3.77 m according to this embodiment.

A dotted line, a solid line, and an alternate long and short dash line represent rays of wavelengths of the d-line, the e-line, and the F-line. The spherical aberration diagram has an abscissa axis of a distance in the optical axis direction, and an ordinate axis of a height of the ray entering the incident pupil. The astigmatism diagram has an abscissa axis of an intersection position between the principal ray and the image plane, and an ordinate axis of an image height of the ray. A broken line T denotes an aberration on a meridional surface, and a solid line S denotes an aberration on a sagittal surface. The distortion diagram has an abscissa axis of an intersection position between the principal ray and the image plane, and an ordinate axis of an image height of the ray.

Figure 3:
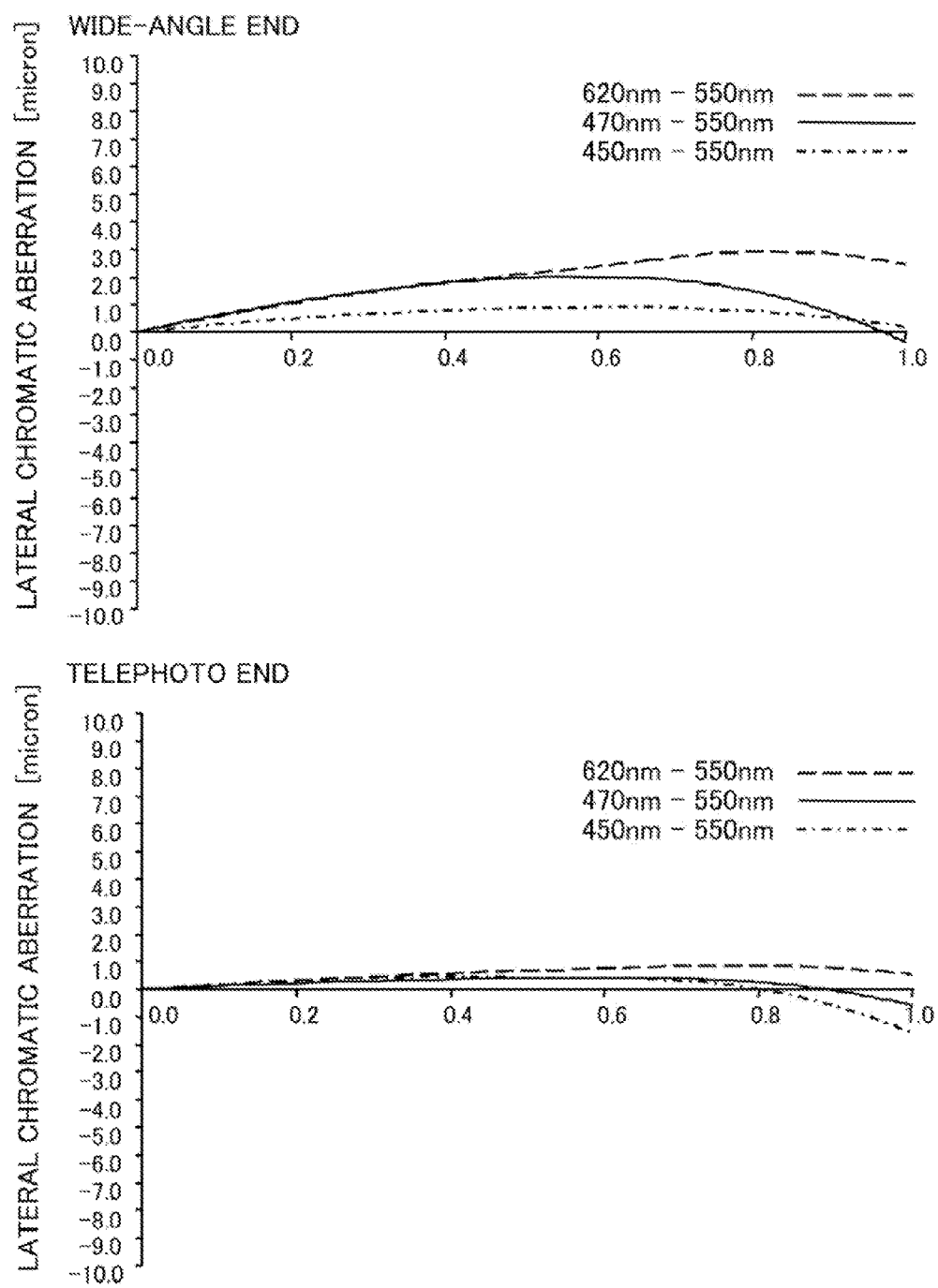
FIG. 3 illustrates lateral chromatic aberrations of the zoom lens illustrated in FIG. 1 according to the first embodiment.

FIG. 3 illustrates lateral chromatic aberration diagrams on the wide-angle end and on the telephoto end of the zoom lens according to this embodiment. The abscissa axis denotes a pupil position, and the ordinate axis denotes a lateral chromatic aberration amount. A dotted line, a solid line, and an alternate long and short dash line represent rays of wavelengths of the d-line, the e-line, and the F-line.

A numerical example of this embodiment will be illustrated below. In a numerical example (A), "i" denotes an order of the i-th optical surface in order from the magnification conjugate side. In (B), "di" denotes a change of an air interval between the i-th optical surface and (i+1)-th optical surface. (C) indicates values of the above conditional expressions 1, 3, 5, 7, 9, 10, and 11.

NUMERICAL EXAMPLE 1

| | f | 38.28~72.06 |
|---|---|---|
| | Fno | 2.03~2.46 |
| | ω | 18.76°~9.57° |

(A)

| Surface number | curvature radius r (mm) | axial surface interval d (mm) | refractive index (Nd) | abbe number (vd) |
|---|---|---|---|---|
| OBJ | infinity | 3770.000 | | |
| 1 | 155.973 | 11.000 | 1.73800 | 32.26 |
| 2 | −511.343 | 7.992 | | |
| 3 | −165.973 | 3.800 | 1.80810 | 22.76 |
| 4 | 129.781 | 9.000 | 1.78800 | 47.37 |
| 5 | −340.727 | 0.500 | | |
| 6 | 72.574 | 8.750 | 1.83400 | 37.16 |
| 7 | 2703.477 | variable | | |
| 8 | 224.758 | 2.000 | 1.78800 | 47.37 |
| 9 | 29.127 | 14.750 | | |
| 10 | −65.750 | 2.500 | 1.48749 | 70.24 |
| 11 | 34.368 | 4.750 | 1.80518 | 25.43 |
| 12 | 141.719 | variable | | |
| 13 | −44.041 | 2.900 | 1.51633 | 64.14 |
| 14 | −52.790 | variable | | |
| STO | infinity | 4.600 | | |
| 16 | −25.898 | 1.400 | 1.72047 | 34.71 |
| 17 | 37.112 | 9.000 | 1.72916 | 54.68 |
| 18 | −37.109 | variable | | |
| 19 | 45.994 | 6.500 | 1.80810 | 22.76 |
| 20 | −116.537 | 5.400 | | |
| 21 | −118.331 | 2.500 | 1.72047 | 34.71 |
| 22 | 28.677 | 8.700 | 1.48749 | 70.24 |
| 23 | −74.880 | 4.800 | | |
| 24 | −32.629 | 2.500 | 1.80518 | 25.43 |
| 25 | 73.049 | 7.700 | 1.48749 | 70.24 |
| 26 | −37.543 | 0.500 | | |
| 27 | 1126.723 | 4.000 | 1.80518 | 25.43 |
| 28 | −83.199 | variable | | |
| 29 | 69.884 | 5.800 | 1.77250 | 49.60 |
| 30 | 1783.192 | 4.100 | | |
| 32 | infinity | 44.020 | 1.51633 | 64.14 |
| 35 | infinity | 21.000 | 1.80518 | 25.43 |
| 36 | infinity | | | |

(B)

| | d7 | d12 | d14 | d18 | d28 |
|---|---|---|---|---|---|
| wide-angle | 3.330 | 5.470 | 35.711 | 5.262 | 6.731 |
| intermediate | 6.026 | 12.188 | 7.967 | 3.803 | 26.520 |
| telephoto | 8.720 | 6.683 | 0.500 | 0.800 | 39.801 |

(C)

| | |
|---|---|
| expression 1 = | 1.456 |
| expression 3 = | −0.78 |
| expression 5 = | 0.985 |
| expression 7 = | 0.025 |
| expression 9 = | 0.53 |
| expression 10 = | 1.06 |
| expression 11 = | 2.90 |

Second Embodiment

Figure 4:
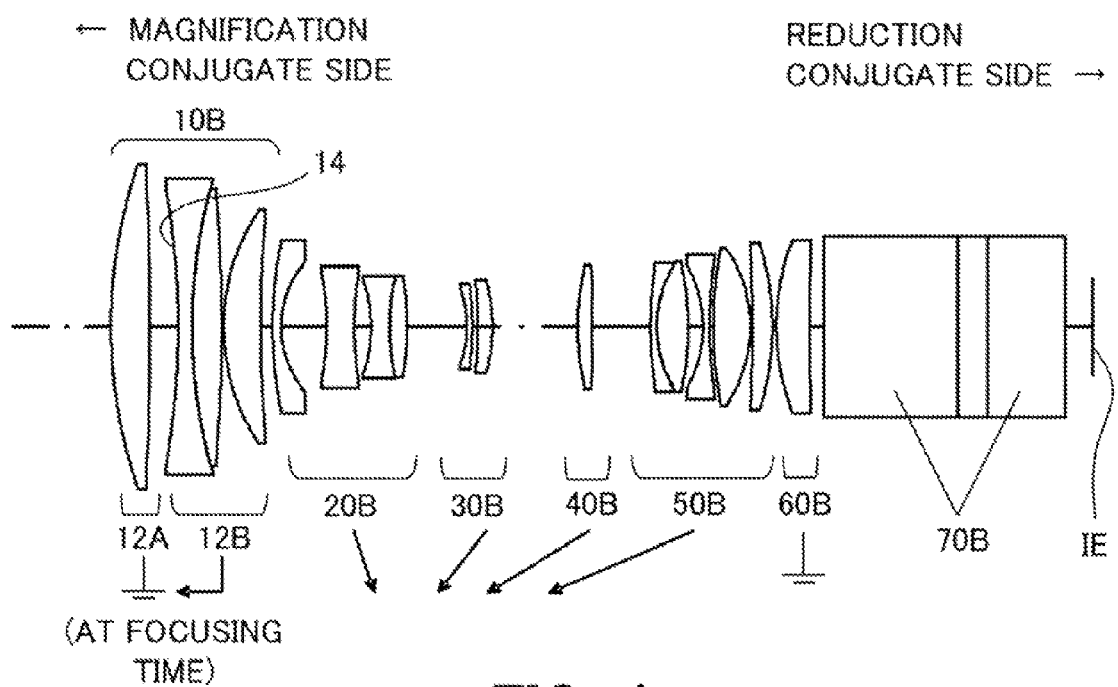
FIG. 4 is a sectional view of a zoom lens at a wide-angle end according to a second embodiment of the present invention.

FIG. 4 is an optical path diagram on a wide-angle end of a zoom lens (projection lens) according to a second embodiment. The zoom lens of this embodiment includes, in order from a magnification conjugate side to a reduction conjugate side, first to sixth lens units 10B to 60B. The first to sixth lens units 10B to 60B include totally seventeen lens elements. Reference numeral 70B denotes a polarization beam splitter. IE denotes a liquid crystal display element. The first to sixth lens units 10B to 60B have positive, negative, negative, positive, positive, and positive refractive (or optical) powers, respectively.

In the magnification variation (zooming), the second, third, fourth, and fifth lens units 20B to 50B move in the optical axis direction. The first lens unit 10B and the sixth lens unit 60B are fixed and do not contribute to the magnification variation. The second to fifth lens units 20B to 50B are magnification-variable (lens) units.

The first lens unit 10B includes a first lens sub-unit 12A that is arranged on the magnification conjugate side and has a positive refractive power, and a second lens sub-unit 12B that is arranged on the reduction conjugate side and has a positive refractive power. The first lens sub-unit 12A is fixed and the second lens sub-unit 12B is configured to move to the magnification conjugate side and to reduce an interval between them during focusing from the infinity to the close end. The first lens sub-unit 12A corresponds to the 1A lens subunit in FIG. 8 and the second lens sub-unit 12B corresponds to the 1B lens sub-unit.

Since the first lens sub-unit 12A is fixed during focusing, the barrel structure can become simpler. In addition, perfect inner focus without moving out can maintain small a front-lens diameter and reduce a lens overall length. Moreover, the fixed front unit is meritorious because it is expected to improve the usability, such as shock-resistance.

The first lens sub-unit 12A includes one positive lens in FIG. 4 (corresponding to the lens G1 in FIG. 8) but may include at least one positive lens.

A surface 14 of the second lens sub-unit 12B closest to the magnification conjugate side (corresponding to a surface of the lens G2 on the magnification conjugate side in FIG. 8) has a concave shape on the magnification conjugate side. The second lens sub-unit includes, but is not limited to, a cemented lens of a biconcave negative lens and a biconvex positive lens along the optical path from the magnification conjugate side, and one positive lens.

Figure 5:
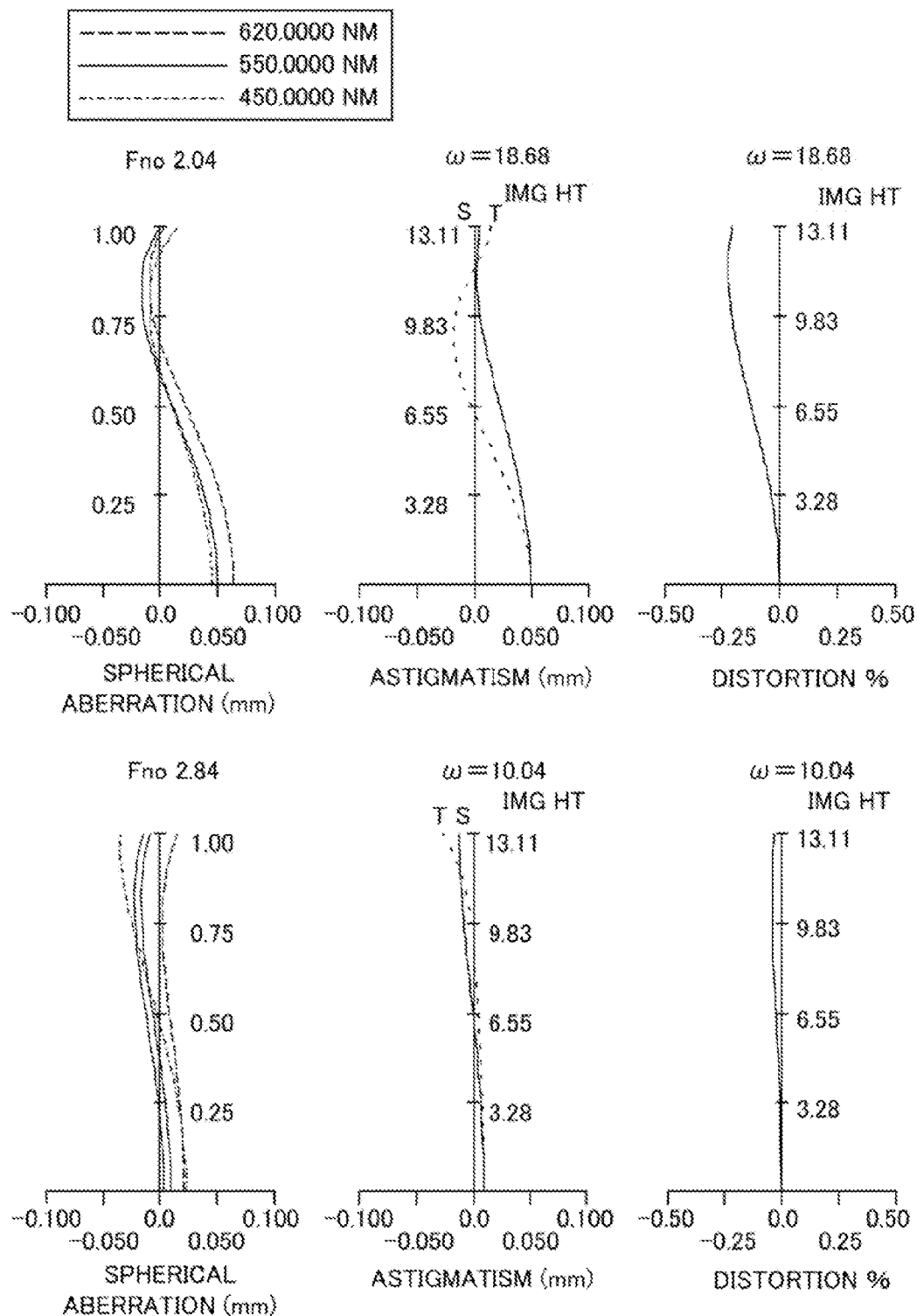
FIG. 5 illustrates aberrational diagrams of the zoom lens illustrated in FIG. 4 according to the second embodiment.
Figure 6:
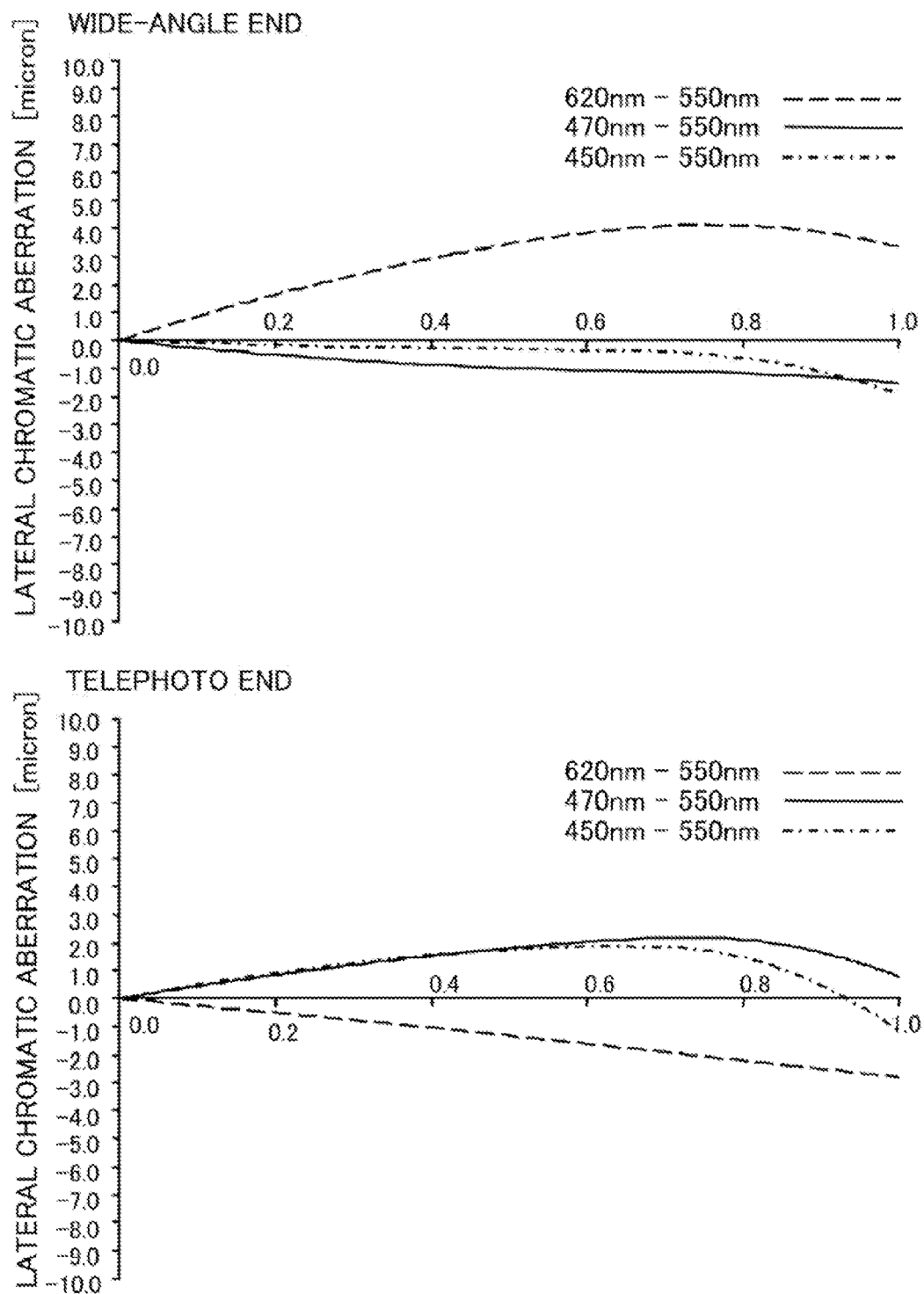
FIG. 6 illustrates lateral chromatic aberrations of the zoom lens illustrated in FIG. 4 according to the second embodiment.

FIG. 5 illustrates aberrational diagrams on the wide-angle end and the telephoto end of the zoom lens with a projection distance of 3.77 m according to this embodiment, and the denotation is the same as that in FIG. 2. FIG. 6 is a lateral chromatic aberration diagram of the zoom lens according to this embodiment, and the denotation is the same as that in FIG. 3. A numerical example of this embodiment will be illustrated below.

NUMERICAL EXAMPLE 2

| f | 38.77~72.81 |
|---|---|
| Fno | 2.04~2.84 |
| ω | 18.68°~10.04° |

(A)

| Surface number | curvature radius r (mm) | axial surface interval d (mm) | refractive index (Nd) | abbe number (vd) |
|---|---|---|---|---|
| OBJ | infinity | 3770.000 | | |
| 1 | 134.200 | 10.500 | 1.65160 | 58.55 |
| 2 | −988.981 | 7.630 | | |
| 3 | −215.183 | 3.800 | 1.80810 | 22.76 |
| 4 | 141.556 | 8.000 | 1.83481 | 42.71 |
| 5 | −426.696 | 0.500 | | |
| 6 | 56.551 | 10.000 | 1.78590 | 44.20 |
| 7 | 347.052 | variable | | |
| 8 | 113.923 | 2.300 | 1.75700 | 47.82 |
| 9 | 26.858 | 12.300 | | |
| 10 | −78.262 | 7.500 | 1.62004 | 36.26 |
| 11 | 94.557 | 4.500 | | |
| 12 | −41.096 | 5.000 | 1.48749 | 70.24 |
| 13 | 63.246 | 4.800 | 1.80810 | 22.76 |
| 14 | −72.647 | variable | | |
| 15 | −29.730 | 1.400 | 1.72151 | 29.23 |
| 16 | −118.388 | 1.600 | | |
| 17 | −102.793 | 4.000 | 1.77250 | 49.60 |
| STO | −43.482 | variable | | |
| 19 | 69.375 | 4.000 | 1.80810 | 22.76 |
| 20 | −551.160 | variable | | |
| 21 | 122.422 | 1.600 | 1.80610 | 33.27 |
| 22 | 32.035 | 8.500 | 1.48749 | 70.24 |
| 23 | −79.796 | 4.000 | | |
| 24 | −33.992 | 1.800 | 1.68893 | 31.08 |
| 25 | 130.940 | 1.000 | | |
| 26 | 111.010 | 10.000 | 1.49700 | 81.55 |
| 27 | −37.683 | 0.500 | | |
| 28 | −601.293 | 5.500 | 1.49700 | 81.55 |
| 29 | −71.942 | variable | | |
| 30 | 64.434 | 9.000 | 1.69680 | 55.53 |
| 31 | 552.449 | 4.000 | | |
| 32 | infinity | 36.020 | 1.51633 | 64.14 |
| 33 | infinity | 8.000 | 1.51633 | 64.14 |
| 34 | infinity | 21.000 | 1.80518 | 25.43 |
| 35 | infinity | | | |

(B)

| | d7 | d14 | d18 | d20 | d29 |
|---|---|---|---|---|---|
| wide-angle | 3.235 | 16.061 | 23.229 | 15.755 | 1.009 |
| intermediate | 6.781 | 8.535 | 11.426 | 17.750 | 14.798 |
| telephoto | 9.567 | 3.087 | 2.089 | 19.554 | 24.992 |

(C)

| expression 1 = | 1.91 |
|---|---|
| expression 3 = | −0.67 |
| expression 5 = | 0.985 |
| expression 7 = | 0.025 |
| expression 9 = | 0.76 |
| expression 10 = | 1.39 |
| expression 11 = | 3.03 |

The zoom lenses of the first and second embodiments are applicable to an optical apparatus. For example, the variable lens shift has almost become a standard equipment in the recent reflection type projector (image projection apparatus), and the reduction of the ghost is an issue because the axial ghost enters the inside of the screen for the 0% shift relative to the 50% shift (which is a shift corresponding to an amount of 50% of the panel). The zoom lenses according to the first and second embodiments can reduce the ghost using the concave surface of G2, and are suitable for the projector having the variable lens shift function in which the ghost can be an issue. Of course, the present invention is applicable to another optical apparatus, such as a digital camera or another image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the present invention is not limited to six (i.e., positive, negative, negative, negative, positive, and positive or positive, negative, negative, positive, positive, and positive) units, and is applicable to five (e.g., positive, negative, negative, positive, and positive) units or the number of units is not limited.

This application claims the benefit of Japanese Patent Application No. 2010-255867, filed Nov. 16, 2010, which is hereby incorporated by reference herein in its entirety.

What is claimed is:

1. A zoom lens comprising, in order from a magnification conjugate side, a first lens unit that has a positive refractive power and is fixed during magnification variations, and a magnification-variable unit configured to move for magnification variations,
   wherein the first lens unit includes, in order from the magnification conjugate side, a first lens sub-unit that has a positive refractive power and is configured to move during focusing, and a second lens sub-unit that has a positive refractive power and is configured to move during focusing,
   wherein the first lens sub-unit and the second lens sub-unit are configured to move and reduce an interval between the first lens sub-unit and the second lens sub-unit for focusing from infinity to a close end, and
   wherein a surface of the second lens sub-unit closest to the magnification conjugate side has a concave shape on the magnification conjugate side.

2. The zoom lens according to claim 1, wherein the second lens sub-unit includes a cemented lens of a biconcave negative lens and a biconvex positive lens, and
   wherein the biconcave negative lens is arranged closer to the magnification conjugate side than the biconvex positive lens.

3. The zoom lens according to claim 2, wherein the following conditional expression is satisfied:

$$0.95 < N_{GR}/N_{GF} < 1.05$$

where $N_{GR}$ is a refractive index of the biconvex positive lens in the cemented lens, and $N_{GF}$ is a refractive index of the biconcave negative lens in the cemented lens.

4. The zoom lens according to claim 2, wherein the following conditional expression is satisfied:

$$1 < (RF23+RR23)/(RR23-RF23) < 10$$

where RF23 is a radius of curvature of a surface of the cemented lens closest to the magnification conjugate side, and RR23 is a radius of curvature of a surface of the cemented lens closest to a reduction conjugate side.

5. The zoom lens according to claim 2, wherein the second lens sub-unit further includes a second positive lens on a reduction conjugate side of the cemented lens along an optical path, and the following conditional expression is satisfied:

$$0.5<(RF4+RR4)/(RR4-RF4)<7$$

where RF4 is a radius of curvature of a surface of the second positive lens closest to the magnification conjugate side, and RR4 is a radius of curvature of a surface of the second positive lens closest to the reduction conjugate side.

6. The zoom lens according to claim 1, wherein the following conditional expression is satisfied:

$$1.0<f_{1B}/f_{1A}<3.0$$

where $f_{1A}$ is a focal length of the first lens sub-unit, and $f_{1B}$ is a focal length of the second lens sub-unit.

7. The zoom lens according to claim 1, wherein the following conditional expression is satisfied:

$$-1.0<f_{1A}/(R_{G21}/(N_{G2}-1))<-0.5$$

where $f_{1A}$ is a focal length of the first lens sub-unit, $R_{G21}$ is a radius of curvature of a surface closest to the magnification conjugate side in the second lens sub-unit, and $N_{G2}$ is a refractive index of a lens closest to the magnification conjugate side in the second lens sub-unit.

8. The zoom lens according to claim 1, wherein the surface having the concave shape satisfies the following conditional expression:

$$0.02<\theta gF-(0.6438-0.001682 \times vd)<0.08$$

where vd=(Nd−1)/(NF−NC), θgF=(Ng−NF)/(NF−NC), Nd, NF, NC, and Ng are refractive indexes to d-line, F-line, C-line, and g-line.

9. The zoom lens according to claim 1, wherein the first lens sub-unit includes a single first positive lens, and the following conditional expression is satisfied:

$$0<(RF1+RR1)/(RR1-RF1)<4$$

where RF1 is a radius of curvature of a surface of the first positive lens closest to the magnification conjugate side in the first positive lens, and RR1 is a radius of curvature of a surface of the first positive lens closest to the reduction conjugate side.

10. An optical apparatus comprising a zoom lens according to claim 1.

11. A zoom lens comprising, in order from a magnification conjugate side, a first lens unit that has a positive refractive power and is fixed during magnification variations, and a magnification-variable unit configured to move for magnification variations, wherein the first lens unit includes, in order from the magnification conjugate side, a first lens sub-unit that has a positive refractive power and is fixed during focusing, and a second lens sub-unit that has a positive refractive power and is configured to move during focusing, wherein the first lens sub-unit and the second lens sub-unit are configured to reduce an interval between the first lens sub-unit and the second lens sub-unit for focusing from infinity to a close end, and wherein a surface of the second lens sub-unit closest to the magnification conjugate side has a concave shape on the magnification conjugate side.

12. The zoom lens according to claim 11, wherein the second lens sub-unit includes a cemented lens of a biconcave negative lens and a biconvex positive lens, and wherein the biconcave negative lens is arranged closer to the magnification conjugate side than the biconvex positive lens.

13. The zoom lens according to claim 12, wherein the following conditional expression is satisfied:

$$0.95<N_{GR}/N_{GF}<1.05$$

where $N_{GR}$ is a refractive index of the biconvex positive lens in the cemented lens, and $N_{GF}$ is a refractive index of the biconcave negative lens in the cemented lens.

14. The zoom lens according to claim 12, wherein the following conditional expression is satisfied:

$$1<(RF23+RR23)/(RR23-RF23)<10$$

where RF23 is a radius of curvature of a surface of the cemented lens closest to the magnification conjugate side, and RR23 is a radius of curvature of a surface of the cemented lens closest to a reduction conjugate side.

15. The zoom lens according to claim 12, wherein the second lens sub-unit includes a second positive lens on a reduction conjugate side of the cemented lens along an optical path and the following conditional expression is satisfied:

$$0.5<(RF4+RR4)/(RR4-RF4)<7$$

where RF4 is a radius of curvature of a surface of the second positive lens closest to the magnification conjugate side, and RR4 is a radius of curvature of a surface of the second positive lens closest to the reduction conjugate side.

16. The zoom lens according to claim 11, wherein the following conditional expression is satisfied:

$$1.0<f_{1B}/f_{1A}<3.0$$

where $f_{1A}$ is a focal length of the first lens sub-unit, and $f_{1B}$ is a focal length of the second lens sub-unit.

17. The zoom lens according to claim 11, wherein the following conditional expression is satisfied:

$$-1.0<f_{1A}/(R_{G21}/(N_{G2}-1))<-0.5$$

where $f_{1A}$ is a focal length of the first lens sub-unit, $R_{G21}$ is a radius of curvature of a surface closest to the magnification conjugate side in the second lens sub-unit, and $N_{G2}$ is a refractive index of a lens closest to the magnification conjugate side in the second lens sub-unit.

18. The zoom lens according to claim 11, wherein the surface having the concave shape satisfies the following conditional expression:

$$0.02<\theta gF-(0.6438-0.001682 \times vd)<0.08$$

Where vd=(Nd−1)/(NF−NC), θgF=(Ng−NF)/(NF−NC), Nd, NF, NC, and Ng are refractive indexes to d-line, F-line, C-line, and g-line.

19. The zoom lens according to claim 11, wherein the first lens sub-unit includes a single first positive lens, and the following conditional expression is satisfied:

$$0<(RF1+RR1)/(RR1-RF1)<4$$

where RF1 is a radius of curvature of a surface of the positive lens closest to the magnification conjugate side in the first positive lens, and RR1 is a radius of curvature of a surface of the first positive lens closest to the reduction conjugate side.

20. An optical apparatus comprising a zoom lens according to claim 11.

* * * * *